United States Patent
Inoko et al.

[11] Patent Number: 6,165,420
[45] Date of Patent: *Dec. 26, 2000

[54] PRODUCTION UNIT FOR PRODUCING HIGH PURITY HYDROCHLORIC ACID AND USING THE SAME

[75] Inventors: Masanori Inoko; Kazunori Akiyama; Kenji Hayashi; Kouichi Tomisawa; Tadashi Koganei; Tatsuharu Obara, all of Kanagawa-ken; Suehiro Oshima, Saitama-ken; Mitsuru Kageyama, Saitama-ken; Kazuyuki Suzuki, Saitama-ken, all of Japan

[73] Assignees: Tsurumi Soda Co., Ltd., Kanagawa-Ken; Kanto Kagaku Kabushiki Kaisha, Tokyo, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/990,368

[22] Filed: Dec. 15, 1997

[30] Foreign Application Priority Data

Dec. 16, 1996 [JP] Japan .................................. 8-353200

[51] Int. Cl.$^7$ ...................................................... B01J 10/00
[52] U.S. Cl. ........................................... 422/162; 422/240
[58] Field of Search .................................... 422/129, 162, 422/240, 241; 423/488

[56] References Cited

U.S. PATENT DOCUMENTS 5,324,497  6/1994  Westerlund ............................. 423/478

*Primary Examiner*—Marian C. Knode
*Assistant Examiner*—Frederick Varcoe, Jr.
*Attorney, Agent, or Firm*—Darby & Darby

[57] ABSTRACT

Disclosed is an apparatus for supplying hydrogen chloride gas from a hydrogen chloride gas generator to an absorbing reactor through a gas supply pipe, and a method for producing hydrochloric acid by allowing the gas absorbed in water in an absorbing reactor. The apparatus obtains a large amount of high purity hydrochloric acid having extremely low impurity concentration with a simple system. The inner wall of the gas supply pipe is constructed with such materials from which impurities are not eluted by hydrochloric acid at least to the position of the wall which is reached by the backward flow or splash of produced hydrochloric acid, vapor of the hydrochloric acid or water in an absorbing reactor.

6 Claims, 2 Drawing Sheets

PRODUCTION UNIT FOR PRODUCING HIGH PURITY HYDROCHLORIC ACID AND USING THE SAME

BACKGROUND OF THE INVENTION

The present invention relates to a unit suitable for industrially producing high purity hydrochloric acid having an extremely low impurity concentration, and to methods for producing hydrochloric acid using the same.

Conventionally, high purity hydrochloric acids are industrially produced, as shown, for example, in FIG. 4, by generating hydrogen chloride gas using a burner hydrochloric acid method or a by-product hydrochloric acid method or the like in a hydrogen chloride gas generator 61, by feeding this to an absorbing reactor 63 through a gas supply pipe 62, and by allowing this to be absorbed in ultrapure water within this reactor 63. The gas supply pipe 62 mentioned above consists of, for example, vinyl chloride resin to nearly the upstream position of the absorbing reactor 63. Valve 65 controls the flow through pipe 64 to absorbing reactor 63. Such materials are not affected by water-free-hydrogen chloride, but are affected by water-containing hydrogen chloride, and elutes such impurities as iron, copper, zinc, nickel, sodium, calcium, potassium, etc. Therefore, materials of the inner wall of the absorbing reactor 63, the part inserted inside the reactor of the gas supply pipe and the product extraction pipe on the downstream of the absorbing reactor are made of acid resistant materials such as fluororesin and the like. By this, impurities can be controlled to elute to a certain extent, but such a composition was still not adequate to produce a high purity hydrochloric acid.

Now, in recent years, in the light of improving the yield of products using hydrochloric acid, there is a need for high purity hydrochloric acid having and impurity concentration smaller than 1 ppb with conventional methods, the impurity concentration of hydrochloric acid is at most 5 ppb or below, the removal of impurity to less than 1 ppb being difficult. Moreover, if hydrochloric acid with the impurity concentration smaller than 1 ppb is to be produced industrially, the products are available only when the quality is acceptable, resulting in increased inspection frequency of generated hydrochloric acid. These complex processes make it difficult to constantly produce a large amount of high purity hydrochloric acid.

Therefore, the purpose of the present invention is to provide a simply-constructed unit for producing hydrochloric acid and a method which allows the efficient production of a large quantity of high purity hydrochloric acid having an extremely low impurity concentration.

SUMMARY OF THE INVENTION

With the aim of solving such a problem, the inventors of the present invention, through their energetic studies, have found that in a conventional hydrochloric acid producing process, the hydrochloric acid produced in the absorbing reactor during the outage flows in the opposite direction from the hydrogen chloride flow in the pipe. Similarly ultrapure water in the absorbing reactor or the vapor of the produced hydrochloric acid splashed in the gas supply pipe causes generation of hydrochloric acid within the gas supply pipe, wherein it is impossible to control the deposition of impurity in the gas supply pipe, as a result, the generated hydrochloric acid resulted in high impurity concentration.

The inventors of the present invention have continued the study based on a new finding that impurities are eluted from the inner wall of the gas supply pipe due to the phenomenon (hereinafter referred to as "back migration") that hydrochloric acid produced in the conventional hydrochloric acid producing process flows backward, or hydrochloric acid vapor and ultrapure water splash on the periphery, as a result, the technology for producing high purity hydrochloric acid which can cope with the problems has been completed.

That is, the present invention is directed to a unit for producing hydrochloric acid by supplying hydrogen chloride gas from a hydrogen chloride generator into the absorbing reactor through a gas supply pipe and by allowing said gas absorbed into water in the absorbing reactors. In the unit of the invention, the inner wall of said gas supply pipe, at least to the position of the wall which is reached by the backward flow or splash of produced hydrochloric acid, its vapor or water in the absorbing reactor, is made of such materials from which impurities cannot be eluted by hydrochloric acid.

In other words, it is the object of the present invention to enable the production of high purity hydrochloric acid by constructing not only the absorbing reactor and the inner wall of the product outlet pipe on the downward side thereof but also the inner wall of a certain range of the gas supply pipe using materials which would not elute impurities by hydrochloric acid.

While the gas supply pipe can be designed into any form, it is desirable to provide apart with a certain height vertically extended from the absorbing reactor in order to prevent the back migration. Thereby, the backward flow of hydrochloric acid or the like in the absorbing reactor shall run into obstacles, because the flow is opposed to gravity if it flows backward in the absorbing reactor. In any event, the inner wall of the gas supply pipe at least to the extent that back migration can occur is composed of materials such as fluororesin which will not elute impurities when contacted by hydrochloric acid.

Further, said materials may be any type of materials so long as it will not elute impurities when contacted by hydrochloric acid, and one example of that is an acid-resisting material such as fluororesin.

In a preferred embodiment of the present invention, at a given position of the gas supply pipe, there is a blocking device which prevents the produced hydrochloric acid, its vapor or water in the absorbing reactor from flowing backward or splashing, and of resists the back migration toward the upstream. This not only prevents the back migration but filters and purifies the hydrogen chloride gas from the upstream side of the gas supply pipe, resulting in removal of impurities as well.

When such a blocking device is provided, it is economical to use such materials that do not elute impurities by hydrochloric acid only from the blocking device to the absorbing reactor, as the inner wall of the gas supply pipe. This makes it possible to minimize the length of the distance to which expensive materials, such as fluororesin, which do not elute impurities by hydrochloric acid, are used.

Moreover, the blocking device may be installed at any position of the gas supply pipe, but if it is installed near the upstream side of the absorbing reactor, it would be more economical by minimizing the amount of expensive fluororesin needed.

It is also desirable that the blocking device is a filter made of materials which will not allow impurities to elute by hydrochloric acid. This prevents impurities from eluting from the filter itself. It is also desirable to have a hydrophobic filter. Thereby, liquified hydrogen chloride containing impurities eluted by water vapor or hydrochloric acid vapor passing the filter backwardly will not easily pass through the filter. Such materials include fluororesin.

With the composition mentioned above, it is possible to produce high purity hydrochloric acid with a simple means of controlling contamination of impurities relative to the back migration and also by preventing hydrochloric acid and the like from flowing upstream from the gas supply pipe by the filter acting as a type of check valve.

DETAILED DESCRIPTION OF THE PREFERRED EMBODIMENTS

Figure 1:
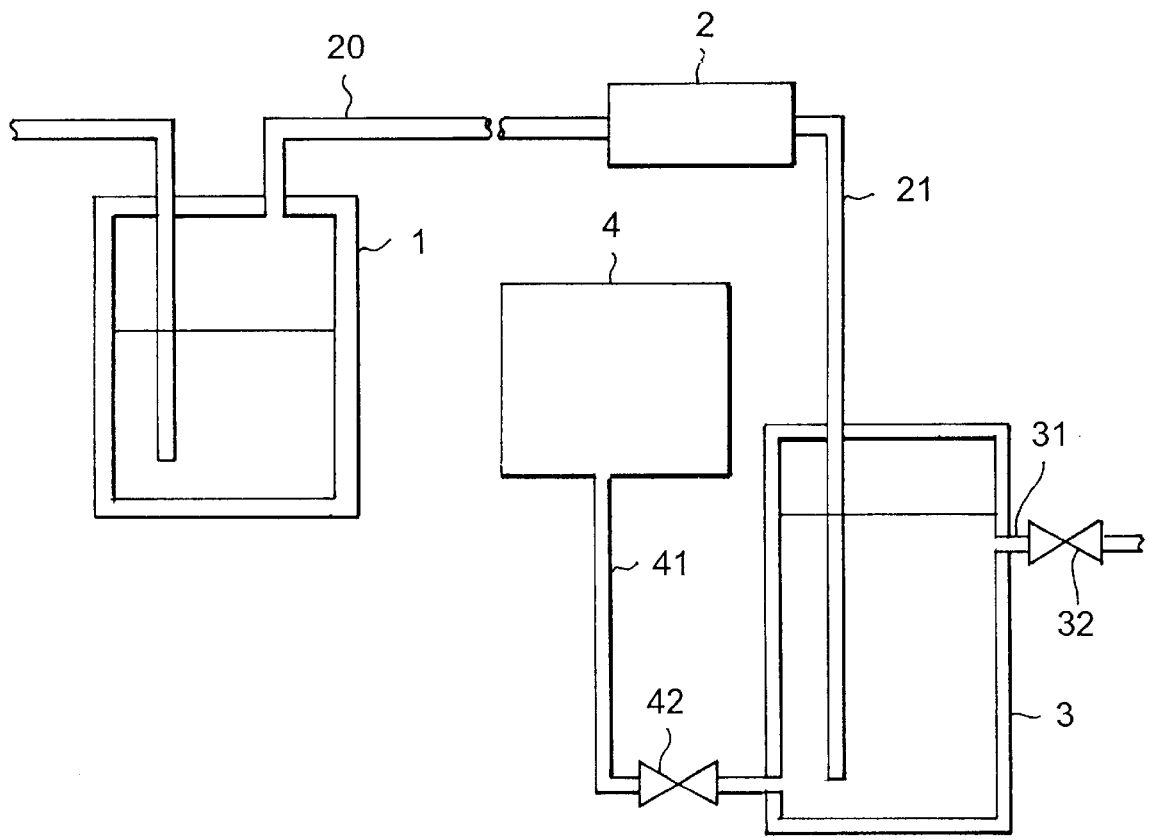
FIG. 1 is a schematic view showing an embodiment of a unit for producing high purity hydrochloric acid according to the present invention.

The preferred embodiments of the present invention are described as follows, but the present invention is not limited to the embodiments. FIG. 1 is a block diagram illustrating a preferred embodiment of a unit for producing high purity hydrochloric acid according to the present invention. "1" in said FIG. is a storage tank for liquified hydrogen chloride. On the downstream side of the liquified hydrogen chloride storage tank 1, a filter 2 can be installed through the gas supply pipe 20 made from, for example, vinyl chloride resin.

Said filter 2 is preferably composed of fluororesin such as polytetrafluoroethylene (Teflon) or the like which will not be eroded by hydrochloric acid and will not elute impurities, and actually it is formed from a film of a pleat construction made of Teflon. On the downstream of the filter 2, a closed absorbing reactor 3 made of, for example, fluororesin is provided.

The tip portion of the gas supply pipe 21 is installed so as to extend nearly to the bottom of the absorbing reactor 3. The absorbing reactor 3 is connected to an ultrapure water tank 4 for storing ultrapure water having, for instance, the specific resistance of $17.7 \times 10^6$ Ω cm and up through the supply pipe 41. 32 and 42 in the figure are valves. Valve 32 controls the flow through pipe 31 to absorbing reactor 3. Valve 42 controls the flow through pipe 41 to water tank 4.

A production process for hydrochloric acid executed in such a unit for producing hydrochloric acids is described as follows. First, raw hydrogen chloride gas is liquified, for example, by being pressured and compressed in a liquefier, and then the liquified hydrogen chloride is stored in a liquified hydrogen chloride tank 1. In the liquified hydrogen chloride tank 1, the liquified hydrogen chloride is vaporized, and when by the increase of the amount of hydrogen chloride gasified the pressure inside the reactor is increased, the hydrogen chloride gas is ventilated through the gas supply pipe 20.

When hydrogen chloride gas passes through the filter 2, impurities existing in the form of particles in the hydrogen chloride gas are removed through the filter 2, thus the concentration of the impurities becomes low.

When a given amount of ultrapure water is supplied from the ultrapure water tank 4 to the absorbing reactor 3 and hydrogen chloride gas is fed in the reactor 3 through the gas supply pipe 21, the gas is absorbed in the ultrapure water and hydrochloric acid is produced. Here, the ultrapure water preferably has the specific resistance of $17.7 \times 10^6$ Ω cm and up, and particularly around $18 \times 10^6$ Ω cm. If hydrogen chloride gas filtered through the filter 2, purified, and passed through the gas supply pipe 21 made of fluororesin is absorbed in such ultrapure water having an extremely high purity, the hydrochloric acid obtained in the absorbing reactor 3 becomes very pure with the impurity concentration of 1 ppb and less.

Since the inner wall of the gas supply pipe 20 is composed of fluororesin to a given upstream position, even if the hydrochloric acid produced in the absorbing reactor 3 flows backward, or the ultrapure water in the absorbing reactor 3 or the vapor of the produced hydrochloric acid splashes, the gas supply pipe 20 is not eroded by the hydrochloric acid. Consequently, impurities are not eluted from the gas supply pipe 20, and the hydrogen chloride gas which is ventilated to the absorbing reactor 3 passing through the gas supply pipe 20 is increased the impurity concentration.

By installing a filter in the gas supply pipe, even if ultrapure water in the absorbing reactor 3 or produced hydrochloric acid flows backward in the upstream direction of the filter 2, the vapor of the ultrapure water or the like splashes, the gas supply pipe 20 in the upstream direction of the filter 2 is eroded by hydrochloric acid or impurities are generated from the gas supply pipe 20, the impurities generated are removed by the filter 2. Therefore, the impurity concentration in the hydrogen chloride gas ventilated to the absorbing reactor 3 can be prevented from increasing.

Thus, as high purity hydrochloric acid can be produced by using a unit according to the present invention, the construction is suitable for industrially producing high purity hydrochloric acid, and a large amount of high purity hydrochloric acid can be produced constantly.

As mentioned above, in the present invention as raw materials, hydrogen chloride gas produced by a burner hydrochloric acid method or by-product hydrochloric acid method, or hydrogen chloride gas generated by burning chlorine and hydrogen can be used. Moreover, in the present invention, raw gas may be directly ventilated to an absorbing reactor through a filter without liquification process.

EXPERIMENTS

Figure 2:
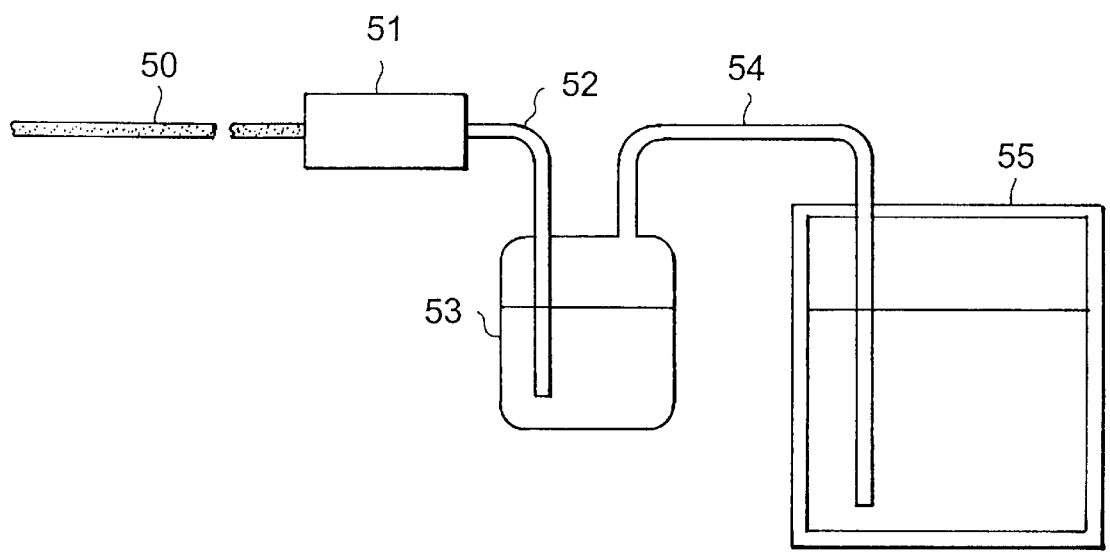
FIG. 2 is a schematic view showing an apparatus (apparatus A) according to the present invention used in experimental examples.
Figure 3:
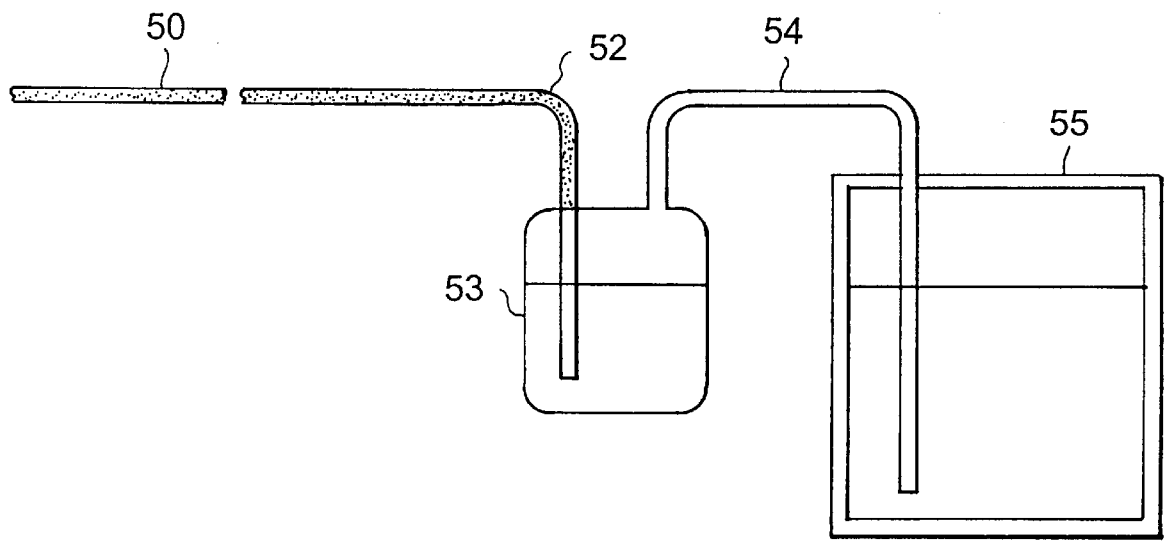
FIG. 3 is a schematic view showing a conventional apparatus (apparatus B) used in experimental examples conducted to confirm the effect of the present invention.
Figure 4:
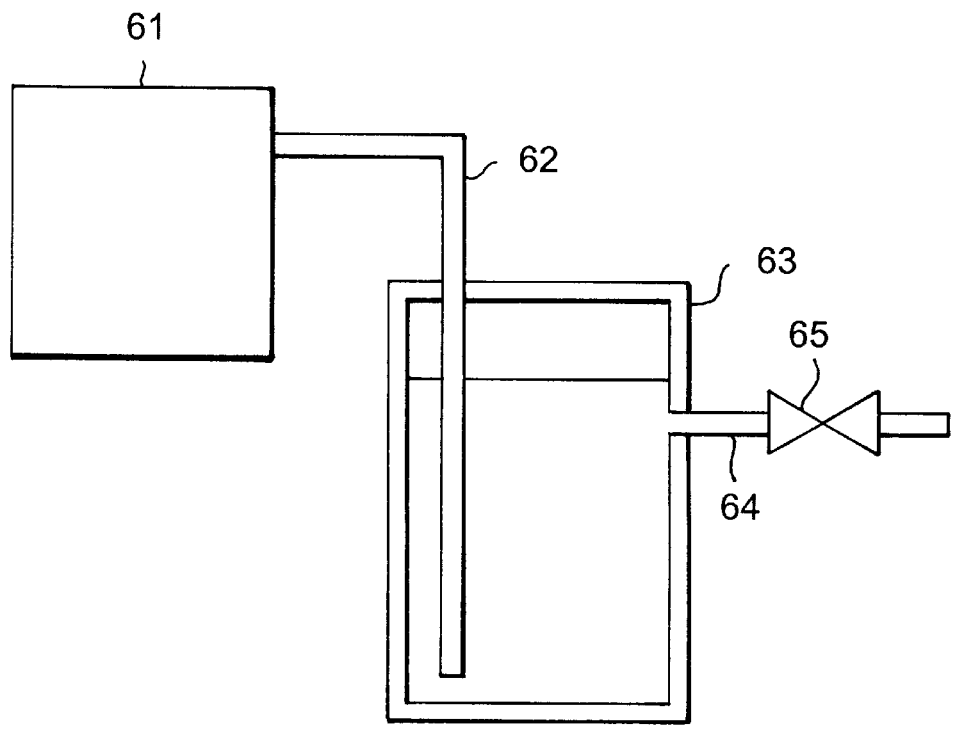
FIG. 4 is a schematic view showing a part of a conventional unit for producing hydrochloric acids.

To confirm the effect of the present invention, the following comparison experiment using the apparatus (apparatus A) of the present application invention as shown in FIG. 2 and a conventional apparatus (apparatus B) as shown in FIG. 3 are performed.

Apparatus Used in the Experiment

In an apparatus A, the gas supply pipe 50 (the part with oblique lines) of 15 mm in inside diameter and 30 meters in length is made of vinyl chloride resin, and a filter 51, a gas supply pipe 52, an absorbing reactor 53, a piping 54 for discharging surplus gas and a surplus gas absorbing bottle 55 are all made of Teflon. As the filter 51, one made of Teflon pleat construction film with the size of 130 mm×80 mm φ is used.

As shown clearly from FIGS. 2 and 3, in this experiment, a batch system is used, so said piping 54 for discharging surplus gas and the surplus gas absorbing bottle 55 are installed so as to discharge and absorb the surplus gas of hydrogen chloride introduced into the absorbing reactor 53.

On the other hand, in the apparatus B, the gas supply pipe 50 (the part with oblique lines) is made of vinyl chloride resin at the position contacting the absorbing reactor 53, and units identical with the apparatus A except for the lack of the filter 51 are used.

Experimental Example 1

To realize the same condition as that in which ultrapure water flows backward from an absorbing reactor, water steam was blown for five minutes into both the apparatus A and B in advance, and then the hydrogen chloride gas containing the following impurities was ventilated into the absorbing bottle 55 until the hydrochloric acid concentration rose to 39%. Then, the impurity concentrations in the respective hydrochloric acids were measured.

Iron: 1 ppb and less, copper: 0.1 ppb and less, zinc: 0.1 ppb and less, nickel: 0.1 ppb and less, sodium: 0.1 ppb and less, calcium: 0.5 ppb and less, aluminum: 0.1 ppb and less, potassium: 0.1 ppb and less.

Experimental Example 2

Without blowing water steam into both the apparatus A and B, hydrogen chloride gas containing the following impurities was ventilated into the absorbing bottle 55 until the hydrochloric acid concentration rose to 39%. After that, impurity concentrations in the respective hydrochloric acids were measured.

Iron: 1 ppb and less, copper: 1 ppb and less, zinc: 1 ppb and less, nickel: 1 ppb and less, sodium: 2 ppb and less, calcium: 2 ppb and less, aluminum: 1 ppb and less, potassium: 2 ppb and less.

Results of Experiments

Results of the experimental examples 1 and 2 are shown in Tables 1 and 2 respectively.

The results of the experimental example 1 shows that the use of the Teflon filter and/or Teflon piping in the downstream direction of the filter contributes to preventing the purity from decreasing due to back migration and also to significant improvement of the purity of produced hydrochloric acid. The results of the experiment example 2 verifies that the Teflon filter improves the purity of produced hydrochloric acid irrespective of the back migration.

TABLE 1

| Impurities | Apparatus A (ppb) | Apparatus B (ppb) |
|---|---|---|
| Iron | 0.03 | 0.06 |
| Copper | 0.0009 | 0.002 |
| Zinc | 0.002 | 0.007 |
| Nickel | 0.0086 | 0.024 |
| Aluminum | 0.005 | 0.036 |
| Sodium | 0.005 | 0.017 |

TABLE 1-continued

| Impurities | Apparatus A (ppb) | Apparatus B (ppb) |
|---|---|---|
| Calcium | 0.0094 | 0.013 |
| Potassium | 0.005 | 0.01 |

TABLE 2

| Impurities | Apparatus A (ppb) | Apparatus B (ppb) |
|---|---|---|
| Iron | <0.03 | <0.7 |
| Copper | <0.03 | <0.4 |
| Zinc | <0.03 | <0.4 |
| Nickel | <0.03 | <0.7 |
| Aluminum | <0.03 | <0.3 |
| Sodium | <0.03 | <0.3 |
| Calcium | <0.05 | <0.4 |
| Potassium | <0.03 | <0.4 |

What is claimed is:

1. A unit for producing hydrochloric acid from water-free hydrogen chloride gas, said unit comprising
   a generator producing water-free hydrogen chloride gas;
   an absorbing reactor comprising water wherein said hydrogen chloride gas absorbs said water in said absorbing reactor;
   a supply pipe transporting said water-free hydrogen chloride gas from said generator to said absorbing reactor, said supply pipe having an inner wall comprising a portion up through which there is a backward flow of said hydrochloric acid, said portion comprising fluororesin;
   a blocking device disposed in the gas supply pipe to prevent the produced hydrochloric acid, its vapor or water in the absorbing reactor from flowing backward or splashing;
   wherein said hydrogen chloride gas absorbs said water in said absorbing reactor.

2. The unit according to claim 1, wherein the inner wall of the gas supply pipe from the absorbing reactor to said blocking device comprises fluororesin.

3. The unit according to claim 2, wherein said blocking device is a filter made of the materials from which impurities are not eluted by hydrochloric acid.

4. The unit according to claim 1, wherein said blocking device is a filter which comprises fluororesin.

5. The unit according to claim 4, wherein said filter is hydrophobic.

6. The unit according to claim 1, wherein said hydrochloric acid has an impurity concentration of 1 ppb.

* * * * *

UNITED STATES PATENT AND TRADEMARK OFFICE
CERTIFICATE OF CORRECTION

PATENT NO. : 6,165,420
DATED : December 26, 2000
INVENTOR(S) : Masanori Inoko

It is certified that error appears in the above-identified patent and that said Letters Patent is hereby corrected as shown below:

Title page,
Item [54], insert -- METHODS OF -- before "USING THE SAME".

Signed and Sealed this

Twenty-fifth Day of September, 2001

Attest:

NICHOLAS P. GODICI
Attesting Officer
Acting Director of the United States Patent and Trademark Office